March 10, 1970 R. R. JOHNS 3,500,069

PULSE REPETITION FREQUENCY DISCRIMINATOR

Filed Oct. 12, 1966

ROBERT R. JOHNS
INVENTOR.
BY T. M. Phillips
J. M. St. Amand
ATTORNEYS

United States Patent Office 3,500,069
Patented Mar. 10, 1970

3,500,069
PULSE REPETITION FREQUENCY DISCRIMINATOR

Robert R. Johns, Riverside, Calif., assignor to the United States of America as represented by the Secretary of the Navy Filed Oct. 12, 1966, Ser. No. 587,374
Int. Cl. H03k 17/00
U.S. Cl. 307—247 2 Claims

ABSTRACT OF THE DISCLOSURE

A pulse repetition frequency discriminator that will permit remote control of the selection of a desired video pulse repetition frequency in the presence of unwanted pulse trains. A pulse train is fed to a coincidence gate in synchronism with normalized trigger pulses delayed in a predetermined manner.

The invention herein described may be manufactured and used by or for the Government of the United States of America for governmental purposes without the payment of any royalties thereon or therefor.

The present invention relates to pulse repetition frequency discriminators and more particularly to pulse repetition frequency discriminators permitting remote control of the selection of a desired video pulse repetition frequency in the presence of unwanted pulse trains.

Selection of a desired pulse repetition frequency has been obtained in several ways. Most known techniques utilize one or more feedback paths and a relatively large number of active and passive components. Generally, a basic timing device such as a crystal oscillator has been used with several counters or dividers, ramp generators, amplitude comparators and coincidence gates. Most discriminators fail to reject any pulse repetition frequency which is an integral multiple or sub-multiple of the preset pulse repetition frequency. Some will accept a wide range of pulse repetition frequency values initially, and then reduce the range through comparison and feedback techniques. Such discriminators cannot operate effectively in a complex signal environment since interruption of transmission from the selected target would permit acquisition of an unwanted signal. Accordingly, an object of the invention is to provide a pulse repetition frequency discriminator that will permit remote control of the selection of a desired video pulse repetition frequency in the presence of unwanted pulse trains.

Another object of the invention is to provide a pulse repetition frequency discriminator which is simple in construction which reduces the size, number of components and power consumption over prior known discriminators.

A further object is to provide a pulse repetition frequency discriminator which is fail-safe in operation if the selected target radar should subsequently stop transmitting.

Other objects and many of the attendant advantages of this invention will become readily appreciated as the same becomes better understood by reference to the following detailed description when considered in connection with the accompanying drawings wherein.

Figure 1:
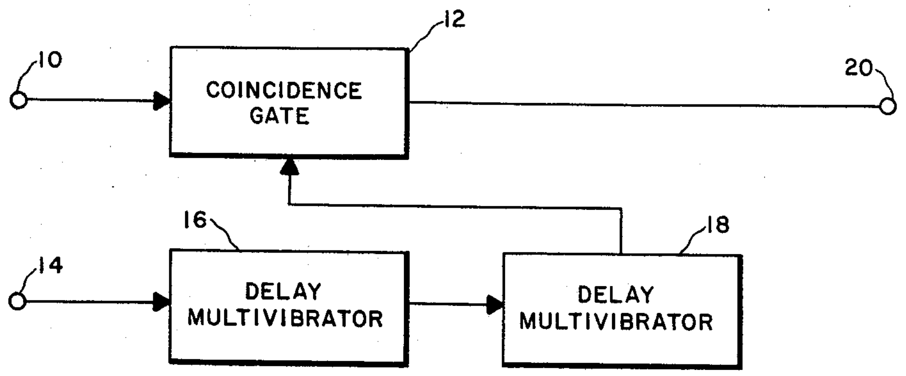
FIG. 1 is a functional block diagram of the invention.

Referring to FIG. 1 there is shown a pulse train at terminal 10 which is fed into coincidence gate 12 in synchronism with normalized trigger pulses at terminal 14 which are fed into delay multivibrator 16. Both the pulse train at terminal 10 and the normalized trigger pulses are derived from the same received signal. The time delay of delay multivibrator 16 is manually set by an operator to a desired value which corresponds to the frequency of the pulse train of interest. At the end of the desired delay the output from delay multivibrator 16 produces an output which is fed to and triggers delay multivibrator 18 which then generates a fixed percentage gate (norminally one-tenth of the delay of multivibrator 16). The output from delay multivibrator 18 is fed to coincidence gate 12. If a video pulse at terminal 10 is present during the presence of the signal from delay multivibrator 18, the video pulse will be passed and appear as an output at terminal 20.

Figure 2:
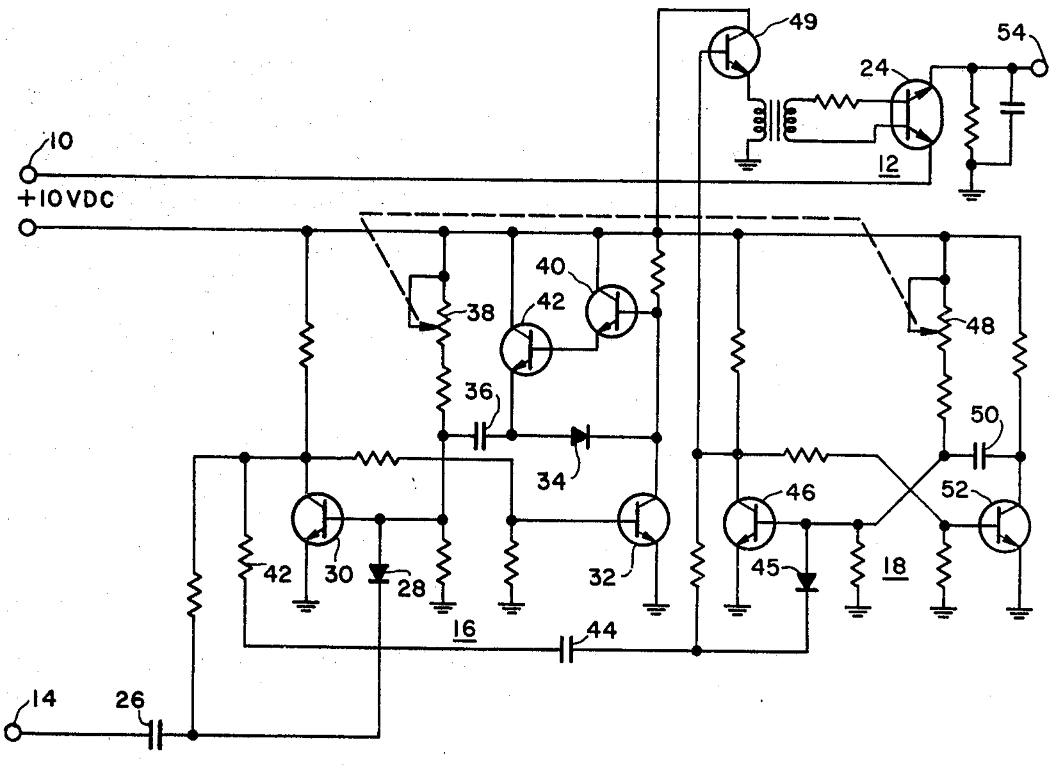
FIG. 2 is a schematic diagram of the embodiment of FIG. 1.

Referring now to FIG. 2 there is shown in schematic form the video pulse train at input terminal 10 and having a period of T seconds applied to coincidence gate 12 which consists of a dual emitter transistor 24. Transistor 24 is normally closed, so the first pulse is rejected. At the same time, the negative trigger pulse at terminal 14 is applied to coupling capacitor 26 and steering diode 28 to cut-off transistor 30. This action causes transistor 32 to conduct resulting in a negative voltage swing at its collector which is applied through diode 34 and capacitor 36 to the base of transistor 30. The negative bias on the base of transistor 30 keeps it off until capacitor 36 is recharged through potentiometer 38. The values of potentiometer 38 and capacitor 36 determine the time delay, T, of delay multivibrator 16.

After the delay, T, transistor 30 begins to conduct, driving transistor 32 off and the collector of transistor rises toward supply voltage (+10 v. DC). Emitter followers 40 and 42 are for providing a high current gain to reduce the time to recharge capacitor 36 to less than two μsec.

The conduction of transistor 30 causes its collector to swing negative and this negative voltage is coupled through resistor 42, capacitor 44 and diode 45 to the base of transistor 46 of delay multivibrator 18. This negative signal turns transistor 46 off for a predetermined fraction of the time, T (10% of T seconds) determined by the values of potentiometer 48 and capacitor 50. Potentiometers 38 and 48 are mechanically linked so that the percentage is unchanged when they are changed over a ten to one range in resistance.

While transistor 46 is non-conducting, a positive voltage is applied to the base of transistor 49. Transistor 49 then conducts and produces a positive pulse at the base of dual emitter transistor 24 which then conducts and permits the second input video pulse to reach output terminal 54. Similarly, all subsequent pulses separated by T seconds to 1.1T seconds will be passed to output terminal 54.

If a video pulse train of pulses with a period greater than 1.1T seconds is applied to input terminal 10, the first pulse will be rejected since coincidence gate 12 is closed (normally non-conducting). Delay multivibrator 16 will be triggered by the first pulse and will drive delay multivibrator 18 which in turn opens gate 12 before the second pulse arrives. The second pulse then cannot pass gate 12. Similarly, the second pulse will open gate 12 before the third pulse arrives, etc. Consequently, none of the pulses in this pulse train will pass through gate 12.

Obviously many modifications and variations of the present invention are possible in the light of the above teachings. It is therefore to be understood that within the scope of the appended claims the invention may be practiced otherwise than as specifically described.

What is claimed is:

1. In a pulse repetition frequency discriminator, the combination comprising:

(a) a normally closed coincidence gate circuit adapted to receive a video pulse train, (b) a first multivibrator delay circuit having a variable time delay means for receiving trigger pulses in time coincidence with the video pulse train received by said normally closed coincidence gate circuit to provide delay output pulses of a predetermined time, (c) a second multivibrator delay circuit having a variable time delay means coupled to said first delay circuit being responsive to said delayed pulses to produce control pulses delayed a fraction of the time delay of said delayed pulses, (d) means mechanically linking the variable time delay means of said first and second delay circuits for maintaining said control pulses at a constant percentage of less than one hundred percent of the time delay of said delayed output pulses when said delay circuits are changed over a predetermined range, (e) circuit means coupling said control pulses to said normally closed coincidence gate to open said gate to permit a pulse that is present during the delay of said control pulse to pass.

2. The discriminator of claim 1 wherein said normally closed coincidence gate is a dual emitter transistor.

References Cited

UNITED STATES PATENTS

| | | | |
|---|---|---|---|
| 2,931,981 | 4/1960 | Schabauer | 328—55 |
| 2,976,432 | 3/1961 | Geckle | 307—273 |
| 3,020,483 | 2/19662 | Losee | 328—94 X |
| 3,202,834 | 8/1965 | Pingry | 307—273 X |
| 3,223,856 | 12/1965 | Joy | 307—293 X |
| 3,322,967 | 5/1967 | Gessner | 307—249 |

JOHN S. HEYMAN, Primary Examiner

R. C. WOODBRIDGE, Assistant Examiner

U.S. Cl. X.R.

307—234, 248, 291, 293, 299; 317—235; 328—111